Oct. 28, 1958
E. A. ROLF
2,857,833
I-BEAM MOUNTING FOR EARTH TILLER
Filed Nov. 26, 1954
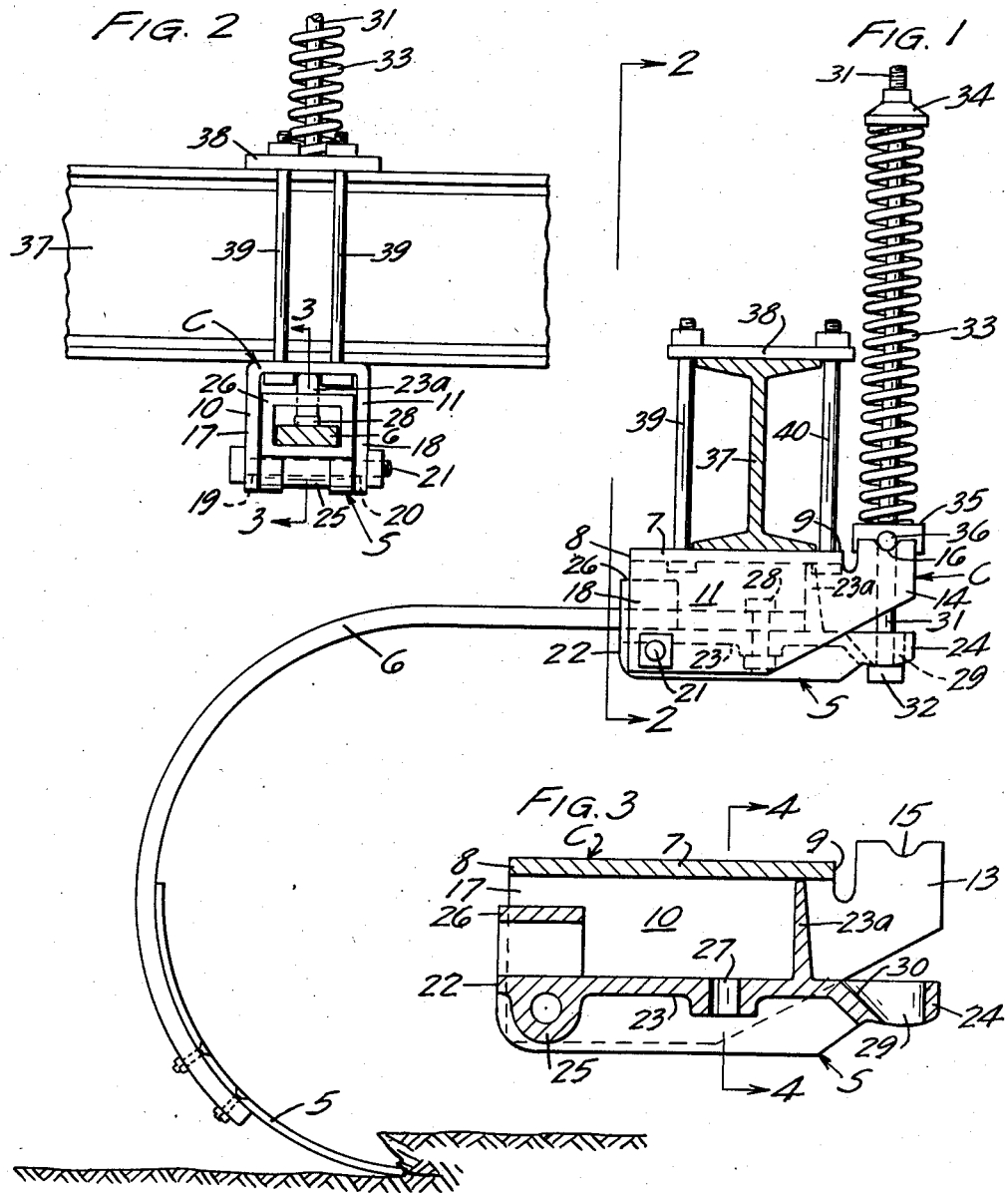
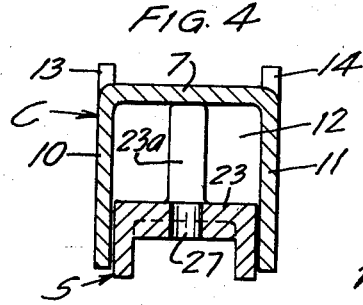
INVENTOR
ELMER A. ROLF
BY
Williamson, Williamson, Schroeder, & Adams
ATTORNEYS

United States Patent Office 2,857,833
Patented Oct. 28, 1958

2,857,833

I-BEAM MOUNTING FOR EARTH TILLER

Elmer A. Rolf, Glencoe, Minn.

Application November 26, 1954, Serial No. 471,278

2 Claims. (Cl. 97—47.84)

This invention relates to agricultural implements. More particularly, it relates to mountings for attaching individual ground tilling devices to agricultural implements.

Mountings for attaching individual ground tilling tools to agricultural implements may generally be constructed in accordance with the disclosure of my prior application for United States Letters Patent, Serial Number 283,174, filed by me on April 19, 1952, and entitled Shank Holder, now matured into United States Letters Patent No. 2,739,518. These mountings may be so constructed in accordance with the work load to which such agricultural implements are generally subjected.. The work loads imposed upon such agricultural implements are generally such as to permit the use of heavy angle irons as supporting cross-members to which the shanks of the individual ground working tools are attached. Cross-members of angle iron construction, however, are inadequate when the machine or implement is designed to accomplish its ground working function in certain types of localities where unusually severe strain is imposed upon the cross-members. In some areas the ground to be worked is of such a nature as to impose abnormal stresses and strains upon the supporting cross-members. In such instances, cross-members having a cross-sectional shape resembling an I may be preferably used because of the much greater strength inherent in such construction. In that event, an entirely differently designed mounting must be provided and it should be constructed to provide maximum strength and still permit connection and easy lateral adjustment along the length of the cross-member. My invention is designed to provide a novel mounting which has these desirable attributes.

It is a general object of my invention to provide a novel and improved mounting for attaching the shank of individual ground tilling devices to a cross-member having a cross-sectional shape resembling an I.

A more specific object is to provide a novel and improved mounting for attaching the shank of a ground working tool to an I-shaped cross-member, the mounting being simple and relatively inexpensive in construction and providing maximum strength and resistance to deformation when placed under stress and strain.

Another object is to provide an improved mounting for connecting the shank of a ground working tool to an I-shaped cross-member, the mounting being resilient in nature and function and yet being capable of being manufactured at low cost and simple to attach and use.

Another object is to provide a novel mounting for attaching the shank of a ground working tool to an I-shaped cross-member wherein the pivotal mounting for the shank of the earth tilling tool and the support for the resilient means which is provided to urge the device downwardly into the soil are incorporated into a single member of inexpensive and simple construction.

Another object is to provide a novel mounting of the type described above wherein the single member has greater strength than comparable mountings heretofore used.

These and other objects and advantages of my invention will more fully appear from the following description made in connection with the accompanying drawings, wherein like reference characters refer to the same or similar parts throughout the several views, and in which:

Fig. 1 is a side elevational view of one embodiment of my invention shown mounted on a cross-member of I-beam cross-sectional shape and supporting the shank of a ground working tool;

Fig. 2 is a partial rear view of my mounting taken along line 2—2 of Fig. 1;

Fig. 3 is a vertical longitudinal sectional view taken along line 3—3 of Fig. 2; and Fig. 4 is a vertical cross-sectional view taken along line 4—4 of Fig. 3.

One embodiment of my invention is shown in Fig. 1 supporting a ground working device, tool or implement 5 in ground working position, the tool 5 being carried by its supporting shank 6 and the shank being secured to the cross-member by the mounting.

My mounting, as shown, may be comprised of an inverted elongated channel member indicated generally as C. This channel member is formed of a single piece of metal bent, as shown, so as to have a base portion 7 with forward and rearward end portions 8 and 9 respectively, and with a pair of openings in each of said end portions spaced transversely of the shank member. A pair of opposite depending sides 10 and 11 extend downwardly from the base portion 7 and defined a channel 12 therebetween in cooperation with the base portion 7. These side members 10 and 11 have forward end portions 13 and 14 respectively which extend forwardly and upwardly, as best shown in Figs. 1 and 3. The upper surfaces of the forward end portions are grooved transversely as at 15 and 16 to receive in supporting relation the resilient mechanism for urging the tool 5 into the soil constantly. The rear end portions 17 and 18 have opposite transverse openings 19 and 20 to receive a pivot pin 21 therein. This pivot pin, as shown, may be a heavy bolt with a nut provided to retain the same in proper position.

An elongated shank holder indicated generally as S is mounted within the channel 12 of the channel member C and has rear end portions 22, medial portions 23 and forward end portions 24. A sleeve member 25 depends from the rear end portion 22 and extends transversely of the shank holder. A longitudinally extending upstanding sleeve member 26 is also carried by the rear end portion 22 and is attached to receive the shank 6 therein in a fairly tight fit. The central portion 23 of the shank holder S is provided with a vertically extending opening 27 which adapts the shank holder to receive a bolt 28 which serves to connect the forward end portion of the shank 6 rigidly to the shank holder S and to cooperate with the sleeve 26 in securing the shank rigidly thereto. It will be noted by reference to Fig. 1 that the shank 6 when so secured extends in longitudinal side-by-side relation to the shank holder S.

The forward end portion 24 of the shank holder S carries an upstanding rigid spacer element 23a which bears against the underside of the base portion 7 and is disposed within the channel 12 of the channel member C. This spacer element 23a keeps the shank holder and the shank extending in horizontal relation except when the ground is sufficiently hard to cause the tool 5 to move upwardly. The forward end 24 also has a vertically extending opening 29 formed therethrough. Adjacent the rear portions of the opening, the opening-defining wall slants upwardly and rearwardly as at 30. As best seen in Fig. 1, the shank holder S is pivotally connected to the channel member C by the pivot pin 21 and is free to swing within the confines of the channel 12 in a vertical plane.

When in use, as best shown in Fig. 1, a tension rod 31 extends vertically upwardly through the opening 29 at the forward end of the shank holder S. A nut 32 larger in diameter than the opening 29 is carried at its lower end and a coil spring member 33 encircles its medial portions. A cap member 34 is carried by the upper end of the tension rod 31 to prevent the coil spring 33 from sliding upwardly off of the tension rod. Between the coil spring 33 and the nut 32 there is a sleeve member 35 which is slidably mounted on the tension rod 31 and has a pair of ears extending laterally outwardly from opposite sides thereof. These ears are of proper size as to fit into the grooves 15 and 16 and thereby maintain the sleeve 35 in a position where the spring 33 is maintained under compression so as to continuously urge the forward end portion of the shank holder upwardly, and consequently the tool 5 downwardly into the soil.

To secure the channel member C to the I-beam 37, which is the cross-member of the agricultural implement, I provide a flat plate member 38 which is sufficiently long so as to extend beyond the sides of the I-beam 37, as best shown in Fig. 1. The plate member also has two pairs of laterally spaced openings formed therein to adapt the same to receive one of two pairs of connecting bolts such as 39 and 40. In other words, two pairs of connecting bolts extend downwardly through the plate member 38 and through the base portion 7 of the channel member C to rigidly and securely connect the channel member to the underside of the I-beam 37. It will be noted that the plate member 38 together with the connecting bolts 39 and 40 and the base portion 7 form a clamp member which also provides a mounting for the shank holder S.

In use my mounting is attached to the I-beam 37, as shown in Fig. 1, and the shank is secured to the shank holder by sliding the shank 6 forwardly through the sleeve 26 and passing the bolt 28 therethrough and through the opening 27 and securing the same. When this has been done and the resilient mechanism shown is connected to the forward end of the shank holder S, as shown in Fig. 1, the device is in position and ready for use. Whenever an unusually hard piece of soil is encountered, or rocks or other obstructions are engaged by the tool 5, it will be forced upwardly and the shank member 6 will pivot about the pivot bolt 21, the forward end portion 24 of the shank holder swinging downwardly and compressing the spring 33. It will be seen that the shank holder S pivots within the channel 12 of the channel member C and that it is constantly urged so as to force the tool 5 down into the soil again as soon as the tool has passed over the obstruction. Thus a resilient mounting is provided for the tool 5 which will preclude breakage and consequent loss of time, material and labor.

It will be noted that my mounting is extremely simple in construction and that it is comprised of a single channel member which not only provides a pivotal mounting for the shank holder S (and hence the shank 6) but also provides support means for supporting the resilient mechanism provided to constantly urge the forward end of the shank holder S upwardly. It will be readily appreciated that my mounting can be manufactured with a minimum of material and cost. One reason for this is because the mounting includes within a single member the pivotal mounting for the shank holder as well as the support for the resilient mechanism required to provide resiliency for the shank. Because the channel member C can be manufactured from a single piece of metal, its cost is reduced to a minimum. In addition, it should be noted that because of its channel-shaped structure, a maximum of strength is provided, and the mounting can be subjected to unusually heavy stresses and strain without any deformation thereof.

It should also be noted that my mounting does not engage only a single portion of the I-beam, but on the contrary, engages the entire beam. This means that undue stress and strain will not be placed upon only a portion of the I-beam as is the case with many mountings provided for this purpose. Mountings which engage only a portion of the I-beam place such an abnormal stress upon that portion that it may be deformed with the result that the shank 6 will no longer be properly disposed and hence the tool 5 will not perform its functions in a proper manner.

It will, of course, be understood that various changes may be made in the form, details, arrangement and proportions of the various parts without departing from the scope of my invention.

What is claimed is:

1. A readily adjustable mounting for attaching an agricultural implement and the like by its support shank to a cross-member of I-shape taken cross-sectionally, said mounting comprising an inverted channel member having a base portion and spaced sides depending therefrom and defining its channel, said base portion having forward and rearward ends adjacent to which it is adapted to be connected to a plate member positioned at the top of such a cross member, a plate member adapted to be placed upon, in superimposed relation, such a cross member, connecting means connecting said plate member and the base portion of said channel member ahead and behind such a cross member to rigidly secure said channel member in inverted position to the underside of such a cross member with its channel extending normally to the cross member, a shank holder extending within the confines of said channel member and having forward and rearward end portions and being adapted to have the shank of an agricultural implement fixedly secured thereto in longitudinal side-by-side relation, pivot means pivotally connecting the rear end portion of said shank holder to the rear end portions of said channel side members, said pivot means including a transverse sleeve member depending from the rear end portion of said shank holder, said shank holder having its forward end portions adapted to have resilient means connected thereto to positively urge the same upwardly, said pivot means connecting the rear end portion of said shank holder to the lower and rear portions of said channel side members, and an upstanding spacer element carried by the forward end portion of said shank holder and extending upwardly against the under side of said base portion whereby said forward end portion of said shank holder is maintained in substantially horizontal spaced relation to said base portion.

2. A readily adjustable mounting for attaching an agricultural implement and the like by its support shank to a cross-member of cross-sectional shape resembling an I, said mounting comprising an inverted channel member having a base portion and spaced sides depending therefrom and defining its channel, said sides having forward and rearward end portions, clamp means for positively and rigidly securing said channel member while in inverted position to the underside of such a cross-member with its channel extending normally to the cross-member, a shank holder, a shank of an agricultural implement fixedly secured to said shank holder against relative movement and extending in longitudinal side-by-side relation and having forward and rearward end portions, and pivot means pivotally connecting one of said end portions of said shank holder to the corresponding end portions of said channel side members, said shank holder having its other end portions free and adapted to have resilient means connected thereto, to positively urge the rear end of said shank downwardly, and rigid spacer means extending between said shank holder and the base portion of the said channel member whereby said free end portion of said shank holder is maintained in substantially horizontal spaced relation to said base portion.

References Cited in the file of this patent

UNITED STATES PATENTS

| | | |
|---|---|---|
| 789,305 | Waterman | May 9, 1905 |
| 894,787 | Waterman | July 28, 1908 |
| 917,603 | Hench | Apr. 6, 1909 |
| 1,865,651 | Traphagen | July 5, 1932 |
| 2,493,811 | Graham | Jan. 10, 1950 |
| 2,627,798 | Graham | Feb. 10, 1953 |

FOREIGN PATENTS

| | | |
|---|---|---|
| 253,298 | Great Britain | June 17, 1926 |